United States Patent [19]

Koenig et al.

[11] Patent Number: 5,688,877
[45] Date of Patent: Nov. 18, 1997

[54] KINETICALLY CONTROLLED IN-SITU GENERATION OF CATALYTIC SPECIES FOR THE CURING OF EPOXY/AMINE COMPOSITIONS

[75] Inventors: Raymond A. Koenig, Vendenheim; Joseph Gan, Strasbourg, both of France; Richard J. Hayman, Frauenfeld, Switzerland

[73] Assignee: The Dow Chemical Company, Midland, Mich.

[21] Appl. No.: 656,262

[22] PCT Filed: Dec. 21, 1994

[86] PCT No.: PCT/US94/14692

§ 371 Date: Jun. 11, 1996

§ 102(e) Date: Jun. 11, 1996

[87] PCT Pub. No.: WO95/18168

PCT Pub. Date: Jul. 6, 1995

[30] Foreign Application Priority Data

Dec. 24, 1993 [GB] United Kingdom ............... 9326427

[51] Int. Cl.⁶ .......................... C08G 59/68; C08B 65/10
[52] U.S. Cl. .................... 525/526; 528/89; 528/90; 528/93; 528/94; 528/106; 528/109; 264/209.6; 264/211.24; 264/331.12; 264/328.2; 525/525
[58] Field of Search ...................... 525/526, 525; 528/89, 90, 93, 94, 106, 109; 264/209.6, 211.24, 331.12, 328.2

[56] References Cited

U.S. PATENT DOCUMENTS

| 3,666,721 | 5/1972 | Godfrey | 528/109 |
| 4,988,549 | 1/1991 | Meyer et al. | 428/35.7 |

FOREIGN PATENT DOCUMENTS

| 2028678 | 5/1991 | Canada. |
| H3-2287 | 1/1991 | Japan. |
| H4-108861 | 4/1992 | Japan. |
| 1254 079 | 11/1971 | United Kingdom. |

OTHER PUBLICATIONS

Chemical Abstracts 113:25242, "Polyamide–Based Multilayer Moldings Containing Thermosetting Resin Layer", Meyer et al.
Derwent Abstracts 72–16726T/11, "Accelerator for Polyadduct Formation Between Epoxy Compounds and Nitrogenous Compounds".
Derwent Abstract 92–295676.

*Primary Examiner*—Frederick Krass

[57] ABSTRACT

A method of preparing epoxy parts wherein the interval of low viscosity of an amine-hardened epoxy system can be extended without sacrifice of cure time. Suitable catalysts for the epoxy-amine hardener reaction are generated in situ. As an advantage, more epoxy articles may be prepared with a given mold capacity having improved wet-out of fiber reinforcement attributed to a larger interval of low viscosity.

12 Claims, No Drawings

KINETICALLY CONTROLLED IN-SITU GENERATION OF CATALYTIC SPECIES FOR THE CURING OF EPOXY/AMINE COMPOSITIONS

This invention relates to a method of extending the low viscosity time for mixture of epoxy resin and hardener. More particularly, the invention relates to a method of extending the low viscosity time for resin of epoxy and hardener without significant lowering of the glass transition temperature (Tg), or the fraction of overall epoxy resin reacted.

German Patent 1,770,045 discloses aryl sulphonates as catalysts for the reaction of epoxide resins and polyamides. U.S. Pat. No. 4,728,676 teaches tertiary or quaternary ammonium salts of alkylating or acidic esters of organic phosphoric acids or phosphonic acids as catalysts of the reaction between epoxides and polyisocyanate. U.S. Pat. No. 4,728,676, Column 2, lines 13–15.

Of course, there is the general background of the art of epoxide preparation, polymerization, and utility widely disclosed in texts such as Lee and Neville, *Handbook of Epoxy Resins*, McGraw-Hill Book Company, 1967; Kirk Othmer, Encyclopedia of Chemical Technology, "Epoxy Resins", Volume 9, (1980).

It is an object of the present invention to provide a reactive resin mixture having an extended pot life for amine cured epoxy resin articles. Extended pot life generally corresponds to a delayed gel point. It is a further object of this invention to provide a method of increasing the "wet-out" of reinforcing fibres of epoxy resin composite articles. Further, it is an object of this invention to provide an improved method of molding an epoxy resin reinforced article by the process known as Resin Transfer Molding (RTM) by reducing the in-mold time of each part. The improved RTM process is characterized in part by a longer period of low viscosity for resin injected into the RTM mold, rapid cross-linking, and improved strength upon demolding of the demolding article as compared with prior art RTM processes, and articles prepared by RTM processes. This improved RTM process makes possible significant production economies.

Further objects of the invention include a reduction of distortion of RTM articles because of reduced shrinkage related to lowered curing temperatures.

A further object of the invention is to provide a process for coating substrates with epoxy films such as wood and plastics which are sensitive to elevated temperatures. Further, an energy saving occurs when powdered epoxy coatings are cured at 110° C. to 120° C. rather than the 150° C. to 200° C. required to cure epoxy coatings of the prior art.

Further, the invention has an objective to provide a hand lay-up-vacuum/pressure bag molding method of making a reinforced epoxy resin article. This invention provides hand lay-up method improved by having a longer time interval in which the epoxy resin is preserved at a lower viscosity to facilitate handling, yet without compromise to the length of the overall molding cycle. This is to say the interval of low viscosity of the mixture of resin and hardener is extended by the method of the invention, but because the cure time is maintained, or is shortened, the overall cycle time is nearly the same as, or shorter than, the cycle time of the corresponding prior art.

For casting and potting of epoxy resin, the invention has as an object, the extension of the interval of low viscosity of epoxy resin to facilitate the escape of gas trapped within the mold, and thereby to provide void-free castings without an increase of, or including a decrease of, mold cycle time.

These and other objectives, and advantages will become apparent from the following further explanation description, examples and claims.

Usual active catalysts known in the art for epoxy-amine curing compositions are acids which when contacting the amine curing agent form immediately the corresponding ammonium salt which is believed to be the active catalytic species. The present invention describes a method of preparing the ammonium salts at a kinetically controlled reaction rate by using as catalyst precursor, an alkylating ester of the corresponding acid. Immediately after contacting the acid ester with the amine the catalyst concentration increases with time from zero to a level approaching full conversion. The active catalyst concentration is therefore very low initially but may be increased to a catalyst concentration sufficient to give a rapid cure but with a delayed viscosity increase as compared to a corresponding catalyst concentration obtained instantaneously when using the acid instead of the acid ester in the same resin-hardener composition.

The rate of in-situ catalyst formation may be controlled at a given temperature by the choice of amine curing agent and by the choice of alkylating ester. This reaction rate is also influenced by the acid residue as well as by the alkyl residue of the ester. In general, for a homologous series of alkyl groups increasing in size, the reactivity decreases as the size of the alkyl group increases for a given acid residue.

The epoxy resin composition is comprised of:

(a) At least one organic compound containing on average more than one epoxide group: such organic epoxy-containing compound may be saturated, unsaturated, aliphatic, cycloaliphatic, aromatic, heterocyclic, or compounds comprising more than one of the foregoing moieties. Mixtures of epoxy containing compounds are also useful.

(b) A polyamine curing agent: useful polyamine curing agents include those having primary or secondary amine hydrogen wherein an ammonium cation may be generated in-situ during the initial curing process.

Such amines may be aliphatic, cycloaliphatic or aromatic polyamines. Generally suitable aliphatic amine curing agents are described in Chapter 7 of the Lee and Neville text *Handbook of Epoxy Resins*, McGraw-Hill, (1967). Generally suitable aromatic amine curing agents are described in Chapter 8 of the Lee and Neville text. Also suitable curing agents are epoxy-amine adduct hardeners resulting from the reaction product of an epoxy compound with excess amine, and polyamido-amines as derived from mono- or polybasic carboxylic acids reacted with an aliphatic polyamine. Typically such amidopolyamines are prepared from the acids derived from fats and oils. Such acids include for example soya, tall oil, and ricinoleic acids.

(c) An alkylating ester (also sometimes identified in the following embodiments as a catalyst promoter): alkylating esters useful in the invention include organic or inorganic acid esters capable of alkylating the amine groups of the polyamine curing agent at a temperature compatible with the molding, casting, potting, or coating processes. Particularly, well-suited are alkyl esters of strong acids such as aryl sulphonic acids, alkyl sulphonic acids, phosphonic acids, trichloroacetic acid, ortrifluoroacetic acid. The alkylating esters useful in the invention may optionally contain also other chemical groups or substituents. Also molecules containing more than one alkylating acid ester group may be used such as for example the di(p-toluene sulfonic acid ester) of ethylene glycol.

(d) Optionally, there may be also present in the epoxy composition ingredients useful as fillers, pigments, plasticizers and reinforcing materials: Suitable fillers include quartz powder, chalk and aluminum oxide. Suitable pigments include titanium dioxide, iron oxide and organic pigments such as phthalocyanine pigments. Suitable plasticizers include dioctylphthalate, tributyl and triphenylphosphate. Suitable reinforcing materials include for example glass, glass fibres, carbon fibres, glass cloth or mats, and fibre tows. Wood products such as sawdust, veneers, plywood or paper can also be used as fillers or reinforcements. Reinforcement may also be present as a separate component of a structure as when a shaped glass fibre preform of reinforcement is inserted in a mold and epoxy resin composition is injected into the mold as in the RTM processes.

Component (a) of the epoxy resin composition may be any aliphatic, cycloaliphatic, aromatic or heterocyclic compound containing on average more than one epoxide group. The polyepoxides preferably used contain from 2 to 4, most preferably 2 epoxide groups per molecule and have an epoxide equivalent weight of from 50 to 1000 and preferably from 155 to 220.

Suitable polyepoxides include polyglycidylethers of polyhydric phenols such as pyrocatechol, resorcinol, hydroquinone, 4,4'-dihydroxydiphenylmethane, 4,4'-dihydroxy-3,3'-dimethyldiphenylmethane, 4,4'-dihydroxydiphenylpropane, 4,4'-dihydroxydiphenylcyclohexane, 4,4'-dihydroxy-3,3'-dimethyldiphenylpropane, 4,4'-dihydroxydiphenyl, 4,4'-dihydroxydiphenylsulfone, tris-(4-hydroxyphenyl)-methane, the chlorination and bromination products of the diphenols mentioned above, novolacs (that is of reaction products of monohydric or polyhydric phenols with aldehydes, particularly formaldehyde, in the presence of acidic catalysts), of diphenols obtained by esterification of 2 moles of the sodium salt of an aromatic hydroxycarboxylic acid with 1 mole of a dihalogen alkane or dihalogen dialkylether (British Patent 1,017,612), or of polyphenols obtained by condensation of phenols and long-chain halogen paraffins containing at least two halogen atoms (GB-PS 1,024,288), or of polyphenols obtained by condensation of phenols with unsaturated aliphatic or cycloaliphatic polyolefins. Other suitable polyepoxides are polyepoxide compounds based on aromatic amines and epichlorohydrin such as N-di(2,3-epoxypropyl)-aniline, N,N'-dimethyl-N,N'-diepoxypropyl-4,4'-diaminodiphenylmethane, N-diepoxypropyl-4-aminophenylglycidyl ether (GB-PS 772,830 and 816,923), N,N,N',N'-tetraepoxypropyl-4,4'-diaminodiphenylmethane.

It is also possible to use glycidyl esters of polybasic aromatic, aliphatic and cycloaliphatic carboxylic acids (for example, phthalic acid diglycidyl ester, adipic acid diglycidyl ester) and glycidyl esters of reaction products of 1 mole of an aromatic or cycloaliphatic dicarboxylic acid anhydride and 1/2 mole of a diol or 1/n mole of a polyol containing n hydroxy groups, or cyclohexanedicarboxylic acid diglycidyl ester optionally substituted by methyl groups.

Glycidyl ethers of polyhydric alcohols such as 1,4-butane diol, 1,4-butene diol, glycerol, trimethylol propane, pentaerythritol and polyethylene or polypropylene glycols may also be used. Also of interest are triglycidyl isocyanurate, N,N'-diepoxypropyloxamide, polyglycidyl thioethers of polyfunctional thiols (for example, of bis-mercaptomethyl benzene or diglycidyl trimethylene trisulfone) and polyglycidyl derivatives of hydantoins.

Finally, it is also possible to use epoxidation products of polyunsaturated compounds such as vegetable oils and conversion products thereof, epoxidation products of di- and polyolefins such as butadiene, vinylcyclohexene, 1,5-cyclooctadiene, 1,5,9-cyclododecatriene, polymers and copolymers containing epoxidizable double bonds, for example copolymers based on polybutadiene, polyisoprene, butadiene-styrene, divinylbenzene, dicyclopentadiene, unsaturated polyesters, also epoxidation products of olefins, which may be obtained by Diels-Alder addition and which may be converted into polyepoxides by epoxidation, or of compounds containing two cyclopentene or cyclohexene rings attached by bridge atoms or groups of bridge atoms. Polymers of unsaturated monoepoxides, for example of methacrylic acid glycidyl ester or allylglycidyl ether, may also be used.

Suitable amine-functional curing agents may be prepared from neat amines or mixtures of amines. Use of a solvent with the amine-functional curing agent is optional. Suitable aromatic polyamines include diaminodiphenylmethane, ethyl or methyl substituted diaminodiphenylmethane and their liquid eutectic mixtures; m-phenylene diamine used alone or in eutectic mixtures with other aromatic polyamines, diethyl diaminotoluene such as blends of 3,5-diethyl-2,4-diaminotoluene and 3,5-diethyl-2,6-diaminotoluene commercially available from Ethyl Corporation.

Suitable amines having aromatic and aliphatic components include diaminomethylbenzene such as metaxylylene diamine (MXDA) available from Mitsubishi Company.

Suitable cycloaliphatic polyamines include 4,4'-diaminodicyclohexylmethane (also known as hydrogenated diaminodiphenylmethane such as PACM 20 available from E.I. dupont deNemours Company), aminoethyl piperazine, 3,3'-dimethyl-4,4'-di amino-dicyclohexylmethane (also known as LAROMIN™ C260 from BASF), diaminocyclohexanes (including commercial products sold as ANCAMINE™ 1770 available from Anchor Chemicals), isophoronediamine (commercially available from Huels Chemische Werke AG).

Suitable aliphatic polyamines included ethylene amines including ethylenediamine, diethylenetriamine, triethylenetetramine, tetraethylenepentamine and higher homologues. Ethoxylated or propoxylated ethyleneamines such as aminoethylethanolamine, polymethylene amines such as hexamethylenediamine and bis-hexamethylene triamine (available from dupont), 2-methyl-pentamethylenediamine (MPMD available from dupont). Propylene amines such as imino-bis-propylamine (A327 available from BASF), Mannick bases curing agents which are condensation products of phenols with formaldehyde and amines such as EPILINK™ 500 from Akzo Chemie. Polyether diamines or triamines such as JEFFAMINE™ D and JEFFAMINE™ T (JEFFAMINE D-400 with an active hydrogen equivalent weight AHEW=104, JEFFAMINE T-403, AHEW=78), available from Texaco Corporation which are aminated polyethylene or polyepoxylene glycols, amino silanes or aminosiloxanes, polyamido-amines such as those commercialized by General Mills Corporation (USA) under the trademark VERSAMIDE™.

Also suitable curing agents include epoxy-amine adducts resulting from the reactions of an excess of polyamine hardener and an epoxy resin such as XZ 92401.00 curing agent from Dow Deutschland Inc.

Suitable amine curing agents also include amino-functionalized urethanes such as the reaction product of poly-ketimine with an isocyanate-terminated urethane prepolymer such as are disclosed in U.S. Pat. No. 5,227,414.

Preferred amines for use as curing agents depend on the application and processing conditions of the resin-curing agent-catalyst system. They include isophorone diamine, diaminocyclohexane, 4,4'-diaminodiphenylmethane, diethyldiaminotoluene such as blends of the 3,5-diethyl, 2,4-diaminotoluene and 3,5-diethyl- 2,6-diaminotoluene as is commercially available from Ethyl Corporation, aminoethylpiperazine and, triethylenetetraamine.

Preferred alkylating esters include esters of sulfonic acids, phosphonic acids, halogenated carboxylic acids such as: Methyl-methanesulfonate, available from FLUKA AG (Switzerland), Ethyl-methanesulfonate, available from E. MERCK, Germany, Methyl-4-toluenesulfonate, available from E. MERCK, Ethyl-4-toluenesulfonate, available from FLUKA, Propyl-4-toluenesulfonate, 2-choroethyl-4-toluenesulfonate, available from ALDRICH Chemical Co., 2-methylbutyl-4-toluenesulfonate, available from ALDRICH Chemical Co., Methyl-trichloroacetate, available from E. MERCK, Methyl-trifluoroacetate, available from E. MERCK, Tetramethyl-methylenediphosphonate, available from LANCASTER SYNTHESIS GmbH, Epoxy-esters of the strong acids and epoxy resins described above such as the 4-toluenesulfonic acid ester of DGEBA epoxy resin is prepared as follows: 112.5 g of D.E.R.™ 330 (a liquid diglycidylether of Bisphenol-A with an epoxy equivalent weight of 180 from Dow Deutschland, Inc.) solution at 90 percent by weight in methyl ethyl ketone was charged in a 500 mL glass reactor and cooled to 0° C. 50 g of p-toluenesulfonic acid monohydrate (obtained from Aldrich Chemie GmbH) solution at 50 percent in methylethyl ketone was added dropwise into the D.E.R.™ 330 solution under nitrogen atmosphere and the mixture was stirred. After the addition of all the p-toluenesulfonic acid solution, the reaction mixture was left for 24 hours at room temperature under stirring. The product was then transferred to a rotary evaporator to evaporate the methyl ethyl ketone solvent. The resulting product contains unreacted epoxy resin and the p-toluenesulfonic acid epoxy-ester, designated DGEBA-PTSA in the following patent examples.

The selection of a useful alkylating ester depends on the epoxy resin and the amine curing agent types and on the processing conditions. Temperature is a significant processing condition in this regard as shown in Examples 1 to 17.

Compositions of the instant invention are prepared and used in a conventional fashion well-known in the art. Essential components (a), (b), and (c) are mixed using conventional and known equipment. Such equipment can include extruders and mixers. Heating may be explored to reduce the viscosity of the mixing components. Components are mixed such that the epoxide component (a) is present in an amount from 30 to 97 per cent by weight. Component (b), the polyamine curing agent, is present in an amount from 3 to 70 per cent by weight. Reactive epoxide groups and active hydrogen (N—H) groups are present in a stoichiometric ratio of 0.6:1 to 1.4:1. Preferably, reactive epoxide groups and active hydrogen groups are present in a stoichiometric ratio of 0.8:1 to 1.2:1.

The component (c), the alkylating esters are present in an amount from 0.05 to 10 percent by weight. Preferably the alkylating esters are present in an amount from 0.1 to 5 percent by weight. Most preferably the alkylating esters are present in an amount from 0.4 to 3 percent by weight.

The optionally present fillers, pigments, plasticizers, solvents and reinforcements may be present from 0 to 80 per cent by weight of the combined resin system plus optional materials. To produce mixtures according to the invention, the essential components, and optional components are mixed together at a temperature from 0° C. to a temperature in excess of the curing temperature depending on the components and the processing equipment. Although there is no restriction in the order of mixing the components it may be advantageous to mix first the epoxy resin with the acid-ester prior to the addition of the amine curing agent to avoid a premature reaction and catalyst formation. The reaction mixtures may be hardened at temperatures above those at which the alkylation reaction of amines by the alkylating esters begins to occur. Generally, the peak reaction activity of these mixtures occurs from 15° C. to 160° C. Advantageously, ester-amine reactive composition are chosen having a reactivity range overlapping the curing temperatures. Experience suggests preferable curing temperatures occur between 60° C. and 150° C., preferably between 80° C. to 120° C. The prepared composition may be used for casting or potting by pouring the composition into suitable molds. The composition may also be injected under pressure into molds optionally containing preformed reinforcing materials such as in the case of resin transfer molding. In this case the preferred method of injection is using a mixing-dispensing machine.

Compositions may be prepared by reacting the composition to a B-stage such that the reaction composition becomes consolidated at temperatures from 0° C. to 100° C., yet containing unreacted epoxide and amine groups to create a condition known in the art as "B-stage". This B-stage material may be reduced in particle size to a powder. In powder form, the composition is usually applied to substrate. Exposure of the coated substrate to reaction conditions at a temperature usually higher than the temperature at which the B-stage resin composition was prepared results in a further reaction of the particles ideally forming a smooth protective barrier such as a coating to protect from corrosion. In this case the activity temperature range of the alkylating ester-amine combination advantageously overlaps the higher temperature at which the B-stage composition is formed into a protective coating.

The process of the present invention is advantageous for resin transfer molding where it has been found to reduce substantially the cycle time so as to create more favorable economic potential and savings to the end-user in the form of capital equipment, and necessary labor per manufacture unit.

Reduced shrinkage of epoxy resin articles is possible through use of the method here disclosed because of the lowered processing temperature made possible by this method. The Lee and Neville text describes curing shrinkage and thermal shrinkage of epoxy resin at pp. 6–29 and at Chapter 17.

TABLE OF ABBREVIATIONS

The following abbreviations are used in the examples to refer to the compositions indicated:
1. Epoxy Resins
Abbreviation Description DGEBA Diglycidyl ether of Bisphenol A, D.E.R.™ 330, a commercial liquid epoxy resin from Dow Deutschland, Inc. having an EEW of 180.

XZ 92430 A commercial solid epoxy resin of low viscosity for powder coating applications available from Dow Deutschland, Inc. having an EEW of 450.

2. Amino Curing Agents
Abbreviation Description

IPD Isophorone Diamine, a commercial epoxy hardener from HUELS AG Germany. ANCA ANCAMINE™ 1770, Diaminocyclohexane curing agent from ANCHOR Chemicals.

MDA 4,4'-diaminodiphenylmethane, from E. MERCK

DETDA 3,5-diethyl-2,4-diaminotoluene/3,5-diethyl-2,6-diaminotoluene 80/20 blend, from ETHYL Corporation.

AEP Aminoethylpiperazine, from Dow Europe S.A.

TETA D.E.H.™ 24 epoxy hardener from Dow Europe S.A., Triethylenetetraamine

3. Alkylating Acid Esters

Abbreviation Description

MMS Methyl-methanesulfonate, FLUKA AG

EMS Ethyl-methanesulfonate, E. MERCK

MPTS Methyl-4-toluenesulfonate, E. MERCK

EPTS Ethyl-4-toluenesulfonate, FLUKA AG

PTSA 4-toluenesulfonic acid monohydrate, E. MERCK

PPTS Propyl-4-toluenesulfonate, prepared in-house

2-CIEPTS 2-chloroethyl-4-toluenesulfonate, ALDRICH CHEMIE GmbH

2-MBPTS 2-methylbutyl-4-toluenesulfonate, ALDRICH CHEMIE GmbH

MTClAc Methylotrichloroacetate, E. MERCK

MTFAc Methyl-trifluoroacetate, E. MERCK

TMMDP Tetramethyl-methylenediphosphonate, from LANCASTER SYNTHESIS

DGEBA-PTSA 4-toluenesulfonate ester of DGEBA epoxy resin, prepared in-house

4. Solvents

Abbreviation Description

DEGDEE Diethyleneglycol diethylether, MERCK
TETRALIN Tetraline, MERCK

EXAMPLES 1-17

Although not wishing to be bound by any theory, it would appear the acid esters may generate in-situ a catalytic species of an ammonium salt by alkylation of the polyamine curing agent. Relative reactivity of acid esters, and amine curing agents may be examined by Examples 1-17. Compositions were prepared in concentrations reflecting standard epoxy-amine curing compositions. To determine the relative reactivity of the acid ester and amine curing agent, the epoxide species was replaced with a high boiling point organic solvent as indicated. The acid ester, and amine curing agent were then added to the organic solvent in the amounts indicated in parts by weight. The compositions of the acid ester, polyamine and organic solvent are followed by means of a METTLER DSC 30 Differential Scanning Calorimeter at a scan rate of 10° C. per minute. Information resulting from the DSC scan and the reaction exotherm gave an indication of the preferred temperature range for the reaction of the acid ester-amine curing agent combination which lies between the start temperature of the reaction and the end temperature of the reaction as indicated by the measured exotherm. Resulting information appears in Table I.

TABLE I

Temperature Range for Alkylation Reaction of Amines (DSC)

| Example Number | Ac. Ester/Solvent/Amine Composition | Temperature Acitivity Range, °C. Start | Peak | End | Enthalpy J/gram |
|---|---|---|---|---|---|
| 1 | MPTS/TETRALIN/IPD 1.5/100/27 | 10 | 51 | 100 | 6.8 |
| 2 | MPTS/DEGDEE/IPD 1.5/100/27 | 15 | 53 | 95 | 5.1 |
| 3 | MPTS/DEGDEE/DACH 1.5/100/17 | 18 | 55 | 85 | 4.8 |
| 4 | MPTS/DEGDEE/MDA 1.5/100/27 | 55 | 120 | 160 | 14.7 |
| 5 | EPTS/TETRALIN/IPD 1.5/100/27 | 80 | 127 | 155 | 9.3 |
| 6 | EPTS/TETRALIN/IPD 3.0/100/27 | 75 | 124 | 155 | 17.4 |
| 7 | EPTS/DEGDEE/DACH 1.5/100/17 | 58 | 117 | 170 | 21.5 |
| 8 | EPTS/DEGDEE/MDA 1.5/100/27 | 95 | 138 | 160 | 4.4 |
| 9 | PPTS/TETRALIN/IPD 1.6/100/27 | 90 | 139 | 170 | 7.3 |
| 10 | PPTS/TETRALIN/DACH 1.5/100/17 | 90 | 132 | 170 | 17.8 |
| 11 | 2-MBPTS/TETRALIN/IPD 1.8/100/27 | 95 | 134 | 170 | 3.7 |
| 12 | 2-CIEPTS/TETRALIN/IPD 1.8/100/27 | 100 | 157 | 175 | 9.8 |
| 13 | MMS/TETRALIN/IPD 0.8/100/27 | 20 | 58 | 85 | 1.3 |
| 14 | EMS/TETRALIN/IPD 0.93/100/27 | 85 | 132 | 160 | 9.3 |
| 15 | MTClAc/TETRALIN/IPD 1.33/100/27 | 62 | 125 | 170 | 7.6 |
| 16 | MTFAc/TETRALIN/IPD 0.95/100/27 | 68 | 124 | 170 | 8.7 |
| 17 | TMMDP/TETRALIN/IPD 1.8/100/27 | 105 | 155 | 192 | 12.3 |

EXAMPLES 18-44

After pairs of acid esters and polyamine curing agents of interest were identified near the temperature range of their peak reactivity, further evaluation was conducted with compositions containing the epoxy resin, the amine hardener and the alkylating ester to examine the increase of viscosity with time. For this the compositions were examined on a cone and plate viscometer at a constant temperature from immediately after mixing to the point of gelation. The time to reach 300 and 2000 mPa·s viscosities, as well as the gel point, were indicated in Table IIa and IIb for the compositions of the examples as indicated. There was apparent from the indicated reaction rates (the time necessary to reach the viscosity check points) that the alkylating ester delayed the viscosity increase presumably by a slower formation of the catalytic species as compared with the corresponding acid: see Example B compared with Example 24, and Example D compared with Example 31. Additionally, samples of the same compositions were isothermally cured in the DSC for 11 minutes. The epoxide composition after eleven minutes of isothermal curing was cooled rapidly. The resulting resin sample was again tested by the DSC at a scan rate of 10° C. per minute so as to determine the glass transition temperature (Tg) already achieved. In this manner, the residual reaction enthalpy was also calculated. In a separate DSC experiment the same compositions were run from 0° C. to 250° C. at a scan rate of 10° C. per minute: from this experiment the total enthalpy of reaction was determined. If it is assumed that at 250° C. the epoxide resin is 100 percent reacted, then it is possible thereby to determine the extent of isothermal cure after 11 minutes as a percent of conversion by comparing the total heat of reaction through 250° C. with the residual heat of reaction after 11 minutes isothermal cure, as follows: percent conversion after 11 minutes isothermal cure=(total reaction enthalpy−residual reaction enthalpy)/Total reaction enthalpy. Tables IIa and IIb include information thus determined for glass transition temperature (Tg) and percent conversion.

The total reaction enthalpy measured for the different amine curing agents -D.E.R.™ 330 systems was found to be independent from the type of catalyst promoter used. Average values obtained were 485 j/g for the system D.E.R. 330/IPD (100/27), 526 j/g for D.E.R. 330/ANCAMINE 1770 (100/18) and 429 j/g for D.E.R. 330/MDA (100/27).

FIG. 5 illustrates by an enlargement of the graph of FIG. 4 over the temperature range from 60° C. to 90° C. a means to determine more precisely the Tg of the partially cured resin after isothermal molding at 90° C. for 11 minutes.

TABLE IIa

Examples of Catalyzed Epoxy Resins Formulations Cured Isothermally.

| Example Number | Temp. °C. | Ac. Ester/parts (cat. promoter) | Amine/parts (hardener) | Epoxy resin 100 parts | Time, min. to visc. 300 mPa·s | 2000 mPa·s | Gel | Tg, °C. 11 min | Conversion % @ 11 min. |
|---|---|---|---|---|---|---|---|---|---|
| 18 | 80 | MMS/1.0 | IPD/27 | DGEBA | 2.35 | 3.8 | 6.6 | 66.6 | 78.5 |
| 19 | 80 | MMS/1.5 | IPD/27 | DGEBA | 1.8 | 3.2 | 5.5 | 78.3 | 80.1 |
| 20 | 80 | MPTS/1.5 | IPD/27 | DGEBA | 2.25 | 3.7 | 6.5 | 67.3 | 76.5 |
| 21 | 80 | EPTS/2.5.5 | IPD/27 | DGEBA | 3.35 | 4.7 | 7.3 | 65.9 | 76.2 |
| 22 | 80 | MPTS/1.5 | ANCA/18 | DGEBA | 2.55 | 4.0 | 6.6 | 69.2 | 82.3 |
| 23 | 80 | EPTS/2.5 | ANCA/18 | DGEBA | 3.4 | 4.8 | 7.5 | 67.7 | 81.8 |
| A | 90 | None | IPD/27 | DGEBA | 6.1 | 8.2 | 12.1 | 49.6 | 63.9 |
| B | 90 | PTSA/1.0 | IPD/27 | DGEBA | 2.0 | 3.1 | 5.3 | 81.5 | 86.2 |
| 24 | 90 | EPTS/1.0 | IPD/27 | DGEBA | 3.0 | 4.2 | 6.4 | 78.2 | 83.8 |
| 25 | 90 | EPTS/1.5 | IPD/27 | DGEBA | 2.65 | 3.7 | 5.8 | 84.4 | 85.2 |
| 26 | 90 | PPTS/2.5 | IPD/27 | DGEBA | 3.05 | 4.2 | 6.3 | 80.6 | 83.6 |
| 27 | 90 | 2-ClEPTS/3.2 | IPD/27 | DGEBA | 3.55 | 4.8 | 7.4 | 76.7 | 81.3 |
| 28 | 90 | EMS/1.7 | IPD/27 | DGEBA | 2.9 | 3.9 | 6.2 | 82.8 | 84.5 |
| 29 | 90 | MPTS/1.0 | ANCA/18 | DGEBA | 2.35 | 3.4 | 5.5 | 85.7 | 89.1 |
| 30 | 90 | EPTS/1.5 | ANCA/18 | DGEBA | 2.75 | 3.8 | 6.1 | 85.1 | 88.7 |

TABLE IIb

Examples of Catalyzed Epoxy Resins Formulations Cured Isothermally.

| Example Number | Temp. °C. | Ac. Ester/parts (cat. promoter) | Amine/parts (hardener) | Epoxy resin 100 parts | Time, min. to visc. 300 mPa·s | 2000 mPa·s | Gel | Tg, °C. 11 min. | Conversion % @ 11 min. |
|---|---|---|---|---|---|---|---|---|---|
| C | 100 | None | IPD/27 | DGEBA | 4.3 | 5.8 | 8.7 | 79.8 | 83.1 |
| D | 100 | PTSA/0.5 | IPD/27 | DGEBA | 2.25 | 2.9 | 4.7 | 98.2 | 91.3 |
| 31 | 100 | EPTS/0.5 | IPD/27 | DGEBA | 2.6 | 3.6 | 5.6 | 98.6 | 91.1 |
| 32 | 100 | PPTS/0.5 | IPD/27 | DGEBA | 3.15 | 4.2 | 6.2 | 94.1 | 90.2 |
| 33 | 100 | PPTS/1.0 | IPD/27 | DGEBA | 2.75 | 3.7 | 5.7 | 98.5 | 90.6 |
| 34 | 100 | DGEBA-PTSA/1.0* | IPD/27 | DGEBA | 2.9 | 3.9 | 5.9 | 96.9 | 91.7 |
| 35 | 100 | MTClAc/2.0 | IPD/27 | DGEBA | 3.5 | 4.8 | 7.6 | 80.7 | 86.5 |
| 36 | 100 | TMMDP/2.5 | IPD/27 | DGEBA | 3.5 | 4.7 | 7.1 | 90.7 | 86.5 |
| 37 | 100 | 2-ClEPTS/3.2 | IPD/27 | DGEBA | 2.5 | 3.4 | 5.1 | 98 | 91.2 |
| 38 | 100 | 2-MBPTS/2.5 | IPD/27 | DGEBA | 3.75 | 4.9 | 7.6 | 82.9 | 85.3 |
| 39 | 100 | PPTS/0.5 | ANCA/18 | DGEBA | 3.15 | 3.9 | 5.7 | 98.7 | 92.7 |

| Example Number | Temp. Deg. C | Ac. Ester/parts (cat. promoter) | Amine/parts (hardener) | Epoxy resin 100 parts | Time, min. to visc. 300 mPa·s | 2000 mPa·s | Gel | Tg, °C. 11 min. | Conversion % @ 11 min. |
|---|---|---|---|---|---|---|---|---|---|
| E | 110 | None | IPD/27 | DGEBA | 3.0 | 3.9 | 5.9 | 105.8 | 93.4 |
| 40 | 110 | 2-ClEPTS/2.0 | IPD/27 | DGEBA | 1.9 | 2.5 | 3.8 | 116.3 | 95.1 |
| 41 | 110 | 2-MBPTS/1.5 | IPD/27 | DGEBA | 2.9 | 3.6 | 5.3 | 111.9 | 95.3 |
| F | 120 | None | MDA/27 | DGEBA | | | No Cure | | |
| G | 120 | PTSA/1.0 | MDA/27 | DGEBA | 1.45 | 2.2 | 3.7 | 106.3 | 94.7 |
| 42 | 120 | EPTS/1.0 | MDA/27 | DGEBA | 3.15 | 4.1 | 5.8 | 102.5 | 93.4 |
| 43 | 120 | PPTS/2.5 | MDA/27 | DGEBA | 3.0 | 3.8 | 5.3 | 107.1 | 96 |

TABLE IIb-continued

Examples of Catalyzed Epoxy Resins Formulations Cured Isothermally.

|   |     |          |        |          | To 5000 visc. | To Gel | Tg 15 min. |   |
|---|-----|----------|--------|----------|---------------|--------|------------|---|
| H | 120 | None     | MDA/10 | XZ 92430 | 2.0           | 6.3    | 70         | — |
| I | 120 | PTSA/1.0 | MDA/10 | XZ 92430 | 1.1           | 3.3    | 64         | — |
| 44| 120 | EPTS/1.0 | MDA/10 | XZ 92430 | 1.4           | 4.0    | 77         | — |

*expressed in parts by weight of PTSA equivalents

TABLE IIc

Calculated (kinetics) Minimum Demolding Time = Time to Reach a Tg 10° C. Below Cure Temperature R(300) and R(2000) Time(Viscosity)Ratios.
DGEBA/IPD - 100/27

| | | | Time, min. to visc. | | | | | Time (visc.) ratios | |
|---|---|---|---|---|---|---|---|---|---|
| Example Number | Temp. °C. | Ac. Ester/parts (cat. promoter) | 300 mPa·s | 2000 mPa·s | Gel | Tg, °C. 11 min. | Conversion % @ 11 min. | Mini. Demold Time, min. | R(300) | R(2000) |
| A  | 90  | None          | 6.1  | 8.2 | 12.1 | 49.6 | 63.9 | >11  |      |      |
| B  | 90  | PTSA/1.0      | 2.0  | 3.1 | 5.3  | 81.5 | 86.2 | 10.1 | 0.20 | 0.31 |
| 24 | 90  | EPTS/1.0      | 3.0  | 4.2 | 6.4  | 78.2 | 83.8 | 11   | 0.27 | 0.38 |
| 25 | 90  | EPTS/1.5      | 2.65 | 3.7 | 5.8  | 84.4 | 85.2 | 10.2 | 0.26 | 0.36 |
| 26 | 90  | PPTS/2.5      | 3.05 | 4.2 | 6.3  | 80.6 | 83.6 | 11   | 0.28 | 0.38 |
| 27 | 90  | 2-ClEPTS/3.2  | 3.55 | 4.8 | 7.4  | 76.7 | 81.3 | >11  |      |      |
| 28 | 90  | EMS/1.7       | 2.9  | 3.9 | 6.2  | 82.8 | 84.5 | 10.5 | 0.28 | 0.37 |
| C  | 100 | None          | 4.3  | 5.8 | 8.7  | 79.8 | 83.1 | >11  |      |      |
| D  | 100 | PTSA/0.5      | 2    | 2.9 | 4.7  | 98.2 | 91.3 | 9.9  | 0.20 | 0.29 |
| 31 | 100 | EPTS/0.5      | 2.6  | 3.6 | 5.6  | 98.6 | 91.1 | 9.7  | 0.27 | 0.37 |
| 32 | 100 | PPTS/0.5      | 3.1  | 4.2 | 6.2  | 94.1 | 90.2 | 10   | 0.31 | 0.42 |
| 33 | 100 | PPTS/1.0      | 2.75 | 3.7 | 5.7  | 98.5 | 90.6 | 9.6  | 0.29 | 0.39 |
| 34 | 100 | DGEBA-PTSA/1.0* | 2.9 | 3.9 | 5.9 | 96.9 | 91.7 | 9.8  | 0.30 | 0.40 |
| 35 | 100 | MTC1Ac/2.0    | 3.5  | 4.8 | 7.6  | 80.7 | 86.5 | >11  |      |      |
| 36 | 100 | TMMDP/2.5     | 3.5  | 4.7 | 7.1  | 90.7 | 86.5 | 11   | 0.32 | 0.43 |
| 37 | 100 | 2-ClEPTS/3.2  | 2.5  | 3.4 | 5.1  | 98   | 91.2 | 9.7  | 0.26 | 0.35 |
| 38 | 100 | 2-MBPTS/2.5   | 3.75 | 4.9 | 7.6  | 82.9 | 85.3 | >11  |      |      |

*expressed in parts by weight of PTSA equivalents
R(300) = Time to reach a viscosity of 300 mPa·s divided by the minimum demold time
R(2000) = Time to reach a viscosity of 2000 mPa·s divided by the minimum demold time For ease of review of the viscosity data compared to the molding cycle time an additional parameter determined for these purposes is identified as the "minimum demold time." The minimum demold ti me was artificially determined as being the point where the Tg equaled the temperature of the mold minus 10° C. Empirically, for some applications it had been determined that resin transfer molded articles were advantageously cured to a point where the glass transition temperature was within 10° C. of the demold temperature in order that the molded articles had sufficient integrity to preserve their shape during the removal process, and immediately thereafter until the molded article cooled to a temperature below the glass transition temperature, or was post-cured in an oven. The minimum demold time for a particular article thus determined as the time at which for a resin composition the Tg equaled the temperature of the curing mold minus 10° C. The mold temperature was maintained at a temperature which was for all practical purposes constant. The minimum demold time (time the resin to cure sufficiently to reach a Tg of 10° C. below the curing temperature) was determined experimentally and calculated by the same DSC experiments as previously described. The percent conversion of all the experimental results for D.E.R. 330/IPD was plotted versus the glass transition temperature (Tg). From the calculated regression curve: percent conversion=$4.695+1.623\,Tg-0.00946\,(Tg)^2+1.92.10^{-5}\,(Tg)^3$, the percent conversion at minimum demold time was found to be 83.8 percent for Tg=80° C. and a mold temperature of 90°C. and 88.1 percent for Tg=90° C. and a mold temperature of 100° C. The minimum demold time was obtained from the DSC experiments by measuring the time needed to reach the specified conversions. The data are reported in Table IIc for Examples 24–28 and 31–38.

The demold time for other systems can be identified by selecting a target mold time, then identifying appropriate esters according to the teaching herein at concentrations sufficient to achieve a Tg sufficient to preserve the integrity of the article upon separation of the article from the mold. "Minimum" in the expression of mold time reflected the commercial objective to accomplish a desired result without the expenditure of unnecessary resource. In the context of an epoxy resin article, time in a mold required to cure the article to a point sufficient to maintain the integrity of the article upon removal of the article from a mold was a minimum demold time in a commercial sense.

The Tg of a polymer may be measured. The percent conversion was indirectly determined. Consequently, there may occur in practice, occasions where the relative Tg of comparative polymer systems does not closely correspond to the relation between present conversion. The extent of cure necessary in the mold, so as to produce an article which maintained its integrity upon separation from the mold, may be expressed in terms of the percent of epoxy groups reacted, or as a difference between the Tg of the article and the mold temperature. Other expressions reflecting the extent of cure were also possible. The extent of cure necessary will depend on the extent the resin was filled with inert filler material, whether the article was reinforced as with glass fibres for instance, and if reinforced, the extent of reinforcing fibres, as well as the geometry of the article. A rigid rule cannot be stated as to the extent of cure necessary in a mold to preserve the integrity of an article upon separation from the mold. However, generally, the Tg difference from the mold temperature of 20° C. will be adequate for an article comprising a high degree of fibre reinforcement, say from 30 percent by volume or more reinforcement. A Tg difference from the mold temperature of 10° C. will suffice for moderately reinforced articles from 30 to 10 percent fibres. Articles having low fibres content such as less than 10 percent by volume will require curing in the mold to a greater extent, perhaps to a Tg within 5° C. of the mold temperature. For purposes of the minimum mold time, fillers behave similar to fibre reinforcement.

Additional "curing"◊ of an epoxy resin article, if necessary, is customarily conducted out of the mold by methods known in the art (Ellis, S. E., 34th Annual Technical Conference, Society of Plastics Engineers. Atlantic City, N.J. 1976).

From a review of the data in Tables IIa, IIb and IIc, for the epoxy resins and the polyamine curing agents indicated, one sees that the addition of alkyl esters of p-toluene sulphonic acid improves the low viscosity behavior of the resin composition. The time to 300 mPa·s and 2000 mPa·s for alkyl esters of toluene sulphonic acid was extended beyond the time for the corresponding viscosities of neat p-toluene sulphonic acid. The degree of cure, as measured by the percent conversion after eleven minutes at equal molar amounts did not suffer even though the composition initially had an extended time of low viscosity. The extended time interval of low viscosity indicated a corresponding delay in the cross-linking of the resin. The balance between the Tg and low viscosity interval may be adjusted. Increasing the concentration of alkyl ester of p-toluene sulphonic acid shortened the interval of low viscosity but increased the percent conversion, the Tg, and did shorten demold time.

In the foregoing examples, it is apparent that the low viscosity interval of an epoxy resin composition can be extended over the values obtainable when the free acid is used to promote the amine-epoxide reaction without sacrifice to the conversion, demold time, or the glass transition temperature. It is also apparent that the acid ester and amine curing agents can be selected to correspond to the cure temperature chosen to give a conversion as required for the strength requirements of the chosen composite article.

The advantage of low viscosity retention during curing of the compositions exemplified in Table IIc in relation to demold time is also expressed numerically by the ratios of the time to reach a viscosity of 300 mPa·s or 2000 mPa·s to the minimum demold time, respectively R(300) and R(2000). The higher the R(300) and R(2000) values, the better the viscosity profile in relation with the needed in-mold cure time. The types and levels of the alkylating acid esters in those examples are selected to give a minimum demold time around ten minutes.

EXAMPLE 45

The ethylester of p-toluene sulphonic acid and the methyl ester of p-toluene sulphonic acid were further examined to evaluate concentration necessary to give an equivalent viscosity after a fixed time interval. Example 45(a) 2.5 parts ethylester; Example 45(b) in an epoxy resin composition of 100 parts diglycidyl ether of bisphenol-A using a blend of diethyldiaminotoluene isomers 80, parts 3,5-diethyl-2,4-diaminotoluene and 20 parts 3,5-diethyl-2,6-diaminotoluene as the polyamine curing agent. The cross over point was found to occur at 22.5 minutes at a viscosity of 1700 mPa·s at a mold temperature of 120° C. Although there is present in Example 45(b) more than 60 percent more p-toluene sulfonic acid residue than in Example 45(a), the composition of Example 45(b) maintained a lower viscosity up to the crossover point after which the curing speed became faster.

EXAMPLE 46–51

Similarly, according to Example 45, the crossover point for the viscosity of corresponding methyl- and ethylesters of p-toluene sulphonic acid with the diglycidylether of bisphenol-A and different polyamine hardeners are reported in Table III. In all cases the compositions containing a much higher amount of the ethylester of p-toluene sulfonic acid than of the methylester maintain a lower viscosity up to the crossover point.

TABLE III

Examples of Delayed Viscosity Increase.

| Example Number | Temp. °C. | Ac. Ester/parts (cat. promoter) | Amine/ parts (hardener) | Epoxy resin 100 parts | Crossover point Time, min. | Crossover point visc., mPa · s |
|---|---|---|---|---|---|---|
| 45 (a) | 120 | MPTS/1.5 | DETDA/ 26 | DGEBA | 22.5 | 1700 |
| 45 (b) | 120 | EPTS/2.5 |  |  |  |  |
| 46 (a) | 90 | MPTS/0.63 | IPD/25 | DGEBA | 3.7 | 2000 |
| 46 (b) | 90 | EPTS/1.5 |  |  |  |  |
| 47 (a) | 80 | MPTS/1.6 | AEP/25 | DGEBA | 1.9 | 700 |
| 47 (b) | 80 | EEPTS/2.4 |  |  |  |  |
| 48 (a) | 70 | MPTS/0.65 | IPD/12.5 + AEP/12.5 | DGEBA | 2.9 | 250 |
| 48 (b) | 70 | EPTS/1.5 |  |  |  |  |
| 49 (a) | 90 | MPTS/0.65 | TETA/13 | DGEBA | 1.7 | 550 |
| 49 (b) | 90 | EPTS/1.5 |  |  |  |  |
| 50 (a) | 70 | MPTS/0.65 | TETA/13 | DGEBA | 5.2 | 1950 |
| 50 (b) | 70 | EPTS/1.2 |  |  |  |  |
| 51 (a) | 25 | MPTS/0.63 | TETA/13 | DGEBA | 29.2 | 3900 |
| 51 (b) | 25 | EPTS/2.5 |  |  |  |  |

EXAMPLE 52

Test panels were prepared from the epoxy resin composition of Example number 46 and reinforcement provided by three Uniflo™ random glass fibre mats available under the designation U816–600 from Vetrotex International Chambery, France. Glass reinforcement comprised 40 percent by weight of the test panels. A mold having thickness of 3 mm was heated at 90° C. The accelerators were matched in concentration to yield a viscosity of 2000 mPa·s after 3 minutes 45 seconds at the mold temperature. After 12 minutes mold time from the start of injection, both panels were removed from the mold and immediately subjected to a simple cantilever test for deflection under their own weight with a 50 cm overhang. The specimen having the ethylester catalyst precursor deflected 88 mm. The specimen having the methylester catalyst precursor deflected 126 mm. Thus, although it was shown that the resin composition comprising the ethylester initially resulted in a lower viscosity resin, which benefited resin flow and fibre wet-out. Nonetheless, the ethylester system resulted in superior stiffness and demolding integrity after 12 minutes mold time.

The foregoing description and examples illustrate the invention. Modification within the scope of the invention may be made without departing from the following claims.

We claim:

1. A method of extending the time for cure of an amine-cured epoxy resin, by an amine curing agent having primal and/or secondary amine functionality, by curing the epoxy resin in the presence of an acid ester capable of alkylating the amino groups of the amine curing agent during cure, under conditions wherein said alkylation occurs and which are sufficient to extend the time of cure as compared to that of the corresponding composition not containing said ester.

2. The method as claimed in claim 1, wherein the epoxy resin comprises an epoxide having more than one epoxide group per molecule, and, per 100 parts by weight of the epoxide, from 3 to 70 parts of the amine curing agent and from 0.05 to 10 parts of the acid ester.

3. The method as claimed in claim 1, wherein the resin is molded at a temperature of at least 50° C. to initiate hardening.

4. The method as claimed in claim 3, wherein the resin is molded at a temperature of from 60° C. to 150° C.

5. The method as claimed in any one of the preceding claims, wherein the epoxy resin is reinforced by a fibrous reinforcing agent.

6. The method as claimed in claim 5, wherein the epoxy resin and the fibrous reinforcement are combined by the process of resin transfer molding (RTM), or by a mixing/dispensing machine.

7. The method as claimed in any one of the preceding claims 1, 2, 3, or 4, wherein the acid ester is an alkyl ester of an alkyl or aryl sulfonic acid, an alkyl ester of a phosphonic acid, or an alkyl ester of a halogenated acetic acid.

8. The method as claimed in claims 1, 2, 3 or 4, wherein the acid ester is a p-toluene sulfonic acid ethyl ester, a p-toluene sulfonic propyl ester, or a 4-toluene sulfonate ester of a DGEBA epoxy resin.

9. A method of extending the low viscosity interval of an accelerated epoxy resin system without extending the curing time required for production of an epoxy resin article therefrom comprising:

(a) preparing an epoxy resin system comprising an epoxide having more than one epoxide group per molecule, and based on 100 parts of said epoxide, from 3 to 70 parts per weight of an amine curing agent having primary and/or secondary amine functionality; and from 0.05 to 10.0 parts by weight of the epoxy resin of an acid ester capable of alkylating the amino groups of the amine curing agent during cure;

(b) maintaining the epoxy resin system at a temperature above the ambient temperature;

(c) wherein the cured article made therefrom attains a Tg measured as of a demold time from 5 minutes to 30 minutes after start of the completion of Steps (a) and (b) of not more than 20° C. less than the temperature of Step (b);

(d) wherein the total conversion of epoxide in the epoxy resin at the temperature of Step (b) is 5 or more percent greater, measured at the demold time, than the conversion of epoxide in a corresponding epoxy resin system but without the acid ester according to Step (a);

(e) and wherein the molar concentration of the ester in Step (a) is more than 1.3 times the molar concentration of the corresponding acid of a corresponding epoxy resin system and wherein the Tg of the cured ester composition is greater than the Tg of the corresponding cured epoxy resin system incorporating the corresponding acid, as measured at the demold time.

10. The method according to claim 9 wherein the ratio of the interval at viscosity less than 2000 mPa·s to the time for the epoxy resin article to attain a Tg equal to the mold temperature minus 10° C. is enhanced by 15 percent, or more, in comparison to the interval at viscosity less than 2000 mPa·s to time of the corresponding epoxy resin article cured with the acid instead of the corresponding acid ester to attain a Tg equal to the mold temperature minus 10° C.

11. The method according to claim 9 or claim 10, wherein the article attains a Tg measured at demold time of not more than 10° C. less than the temperature of step (b).

12. The method according to any one of claims 9 to 10, wherein the ratio of the time interval at viscosity less than 2000 mPa·s to the time in the mold for the epoxy resin article to attain integrity sufficient for the article to be removed from the mold is enhanced by 15 percent, or more, in comparison to the interval at viscosity less than 2000 mPa·s to the time for a corresponding epoxy resin article prepared from a resin system incorporating the acid of the corresponding ester to attain integrity sufficient for the corresponding article to be removed from the mold.

* * * * *